(12) United States Patent
Ezawa et al.

(10) Patent No.: US 9,854,172 B2
(45) Date of Patent: Dec. 26, 2017

(54) IMAGE STABILIZATION APPARATUS AND IMAGE PICKUP APPARATUS APPLIED WITH IMAGE STABILIZATION APPARATUS

(71) Applicant: OLYMPUS CORPORATION, Hachioji-shi, Tokyo (JP)

(72) Inventors: Hiroshi Ezawa, Yokohama (JP); Ryosuke Shimokawa, Koganei (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/295,399

(22) Filed: Oct. 17, 2016

(65) Prior Publication Data

US 2017/0155846 A1 Jun. 1, 2017

(30) Foreign Application Priority Data

Nov. 27, 2015 (JP) .................................. 2015-232290

(51) Int. Cl.
  H04N 5/232 (2006.01)
  H04N 5/225 (2006.01)
  G02B 27/64 (2006.01)

(52) U.S. Cl.
  CPC ....... *H04N 5/23287* (2013.01); *G02B 27/646* (2013.01); *H04N 5/2252* (2013.01); *H04N 5/2253* (2013.01); *H04N 5/2254* (2013.01)

(58) Field of Classification Search
  CPC ............. H04N 5/23287; H04N 5/2252; H04N 5/2253; H04N 5/2254; G02B 27/646
  See application file for complete search history.

(56) References Cited

U.S. PATENT DOCUMENTS

| 4,945,367 | A | * | 7/1990 | Blackshear | ...... G08B 13/19619 348/143 |
| 8,385,065 | B2 | * | 2/2013 | Weaver | ................ G03B 15/006 165/104.33 |
| 8,764,318 | B2 | * | 7/2014 | Wada | ................... H04N 5/2252 348/143 |
| 2015/0181128 | A1 | * | 6/2015 | Kaku | ..................... G02B 7/102 348/143 |

FOREIGN PATENT DOCUMENTS

JP         5372641 B2       12/2013

* cited by examiner

*Primary Examiner* — Tuan Ho
(74) *Attorney, Agent, or Firm* — Holtz, Holtz & Volek PC

(57) ABSTRACT

An image stabilization apparatus includes a fixed barrel member, a movable barrel member configured to hold an optical lens, a support member configured to movably support the movable barrel member with respect to the fixed barrel member within a plane orthogonal to an optical axis of the optical lens and a drive unit configured to drive the movable barrel member with respect to the fixed barrel member, in which the fixed barrel member or the movable barrel member includes a support member disposing portion configured to rotatably accommodate the support member and limit an amount of movement of the support member within a plane and a small spatial region portion formed by notching part of the support member disposing portion so as to communicate with the support member disposing portion, an interior of the small spatial region portion being filled with a lubrication member.

8 Claims, 15 Drawing Sheets

IMAGE STABILIZATION APPARATUS AND IMAGE PICKUP APPARATUS APPLIED WITH IMAGE STABILIZATION APPARATUS

CROSS REFERENCE TO RELATED APPLICATION

This application claims the benefit of Japanese Application No. 2015-232290 filed in Japan on Nov. 27, 2015, the contents of which are incorporated herein by this reference.

BACKGROUND OF THE INVENTION

1. Field of the Invention

The present invention relates to an image stabilization apparatus provided with a mechanism configured to correct image blur of an optical image formed by an image pickup optical system and an image pickup apparatus to which the image stabilization apparatus is applied.

2. Description of the Related Art

Conventionally, image pickup apparatuses are generally commercialized which are configured to sequentially photoelectrically convert an optical image formed by an image pickup optical system using an image pickup device or the like, store the image signal thereby acquired in a storage medium as image data (still image) or video data (movie) in a predetermined mode or transmit the acquired image signal to an image display apparatus so as to be able to sequentially displayed.

Furthermore, in recent years, various camera systems are becoming widespread which install and fix the aforementioned type of image pickup apparatus outdoors or indoors so as to be able to monitor a situation of a region or space to be imaged all the time intended for fixed-point observation, monitoring or crime prevention.

Furthermore, among such camera systems, a type of network camera system or the like is being commercialized which includes an image pickup apparatus, a terminal apparatus and an image display apparatus or the like, all of which are connected to an existing network such as the Internet. Such a network camera system is configured such that by operating the terminal apparatus, an operator (user) can remotely operate the image pickup apparatus via the network, receive image data and video data acquired by the image pickup apparatus through the terminal apparatus via the network, display and confirm images based on the received image data and video data using an image display apparatus connected to the terminal apparatus.

Furthermore, various types of so-called vehicle-mounted camera systems are commercialized and widely used in which a type of image pickup apparatus similar to that applied to the above network camera systems is installed and fixed in a vehicle or the like to thereby display, on an image display apparatus, images of situations of a region which becomes a blind spot when seen from a driver's seat such as a rearward region or a sideward region of the vehicle, consecutively pick up images of regions surrounding the running vehicle to thereby record movie data for predetermined time periods before and after a predetermined time point (e.g., a time point at which an abnormal impact is received (a so-called time point of accident occurrence)) in a recording medium and use acquired forward field of view images or the like to control a lane keeping function or emergency stop function.

The camera systems of such a type tend to be often installed and fixed outdoors, indoors or in a vehicle or the like where the camera systems are not easily accessible to an operator's (user's) hand and are operated continuously in such a fixed state.

On the other hand, various conventional image pickup apparatuses provided with an image stabilization apparatus are disclosed, for example, in Japanese Patent Publication No. 5372641 and commercialized, the image stabilization apparatus being configured to be able to correct so-called image blur caused by a phenomenon in which the image pickup apparatus shakes when an image pickup operation is in progress, causing an optical image formed by an image pickup optical system to become unstable on a light receiving surface of the image pickup device.

The image stabilization apparatus disclosed in above Japanese Patent Publication No. 5372641 or the like is of a type in which image blur is corrected by moving part of optical lenses making up the image pickup optical system within a plane orthogonal to an optical axis at predetermined timing and in a predetermined direction. In this case, a movable portion of a mechanism section for performing image stabilization is configured to be supported to a fixed portion using a ceramic ball, a steel ball or the like. Here, the ceramic ball, the steel ball or the like are generally lubricated using grease or the like.

SUMMARY OF THE INVENTION

An image stabilization apparatus according to an aspect of the present invention includes a fixed barrel member, a movable barrel member configured to hold an optical lens or an image pickup device, a support member configured to movably support the movable barrel member with respect to the fixed barrel member within a plane orthogonal to an optical axis of the optical lens or within a plane along a light receiving surface of the image pickup device, and a drive unit configured to drive the movable barrel member with respect to the fixed barrel member, in which the fixed barrel member or the movable barrel member includes a support member disposing portion configured to rotatably accommodate the support member and limit an amount of movement of the support member within the plane and a small spatial region portion formed by notching part of the support member disposing portion so as to communicate with the support member disposing portion, an interior of the small spatial region portion being filled with a lubrication member.

An image pickup apparatus according to an aspect of the present invention includes a camera unit including an image pickup device and an image pickup optical system, a case configured to accommodate the camera unit, and a cover member configured to cover and protect part of the camera unit, in which the image pickup apparatus applies the above image stabilization apparatus.

Benefits of the invention will become more apparent from the following detailed description.

DETAILED DESCRIPTION OF THE PREFERRED EMBODIMENTS

Figure 1:
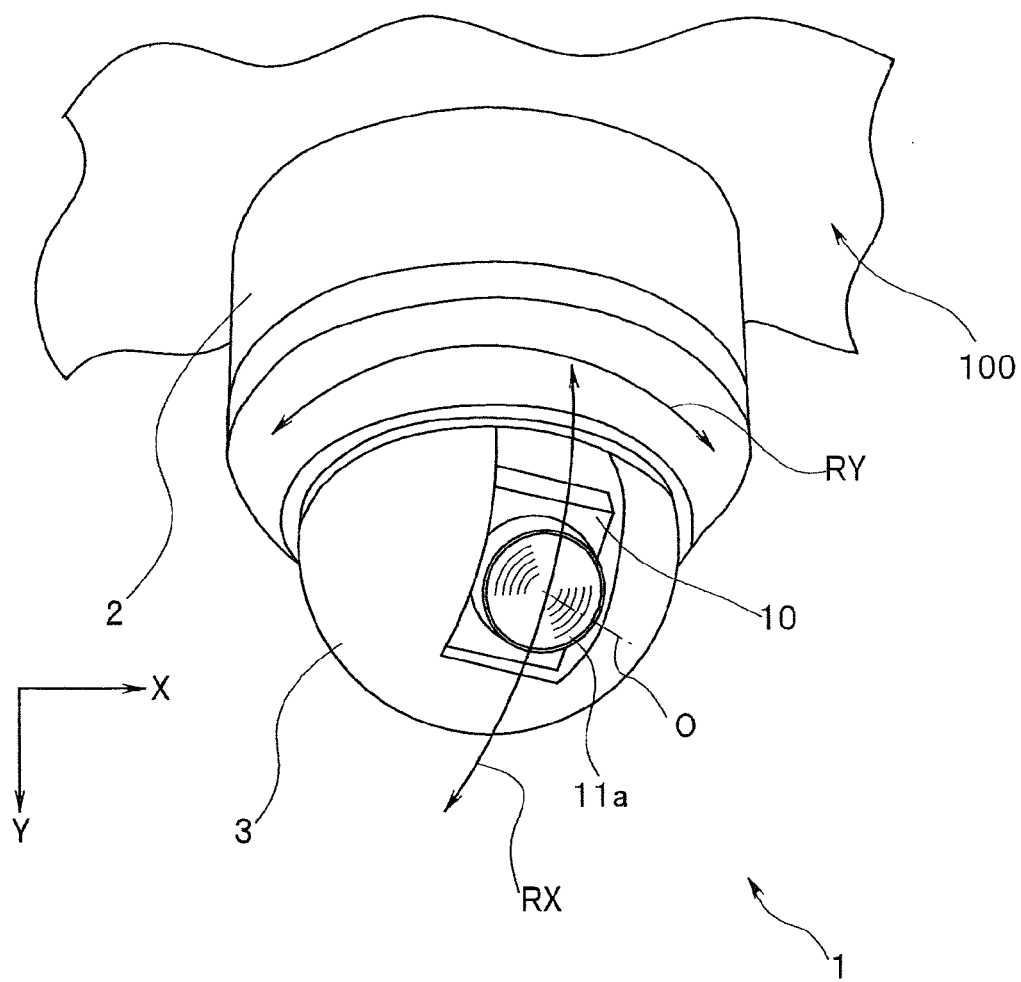
FIG. 1 is an external perspective view schematically illustrating an exterior appearance of an image pickup apparatus according to a first embodiment of the present invention.

Hereinafter, the present invention will be described according to embodiments illustrated in the accompanying drawings. The respective drawings used for the following description are intended for schematic illustration, and respective components may be shown in different dimensional relationships and scales among respective members, varying from one component to another so that the respective components are shown in sizes they are recognizable on the drawings. Therefore, the present invention is not limited to only the illustrated modes with regard to quantities of the components, shapes of the components, size ratios among the components and relative positional relationships among the respective components described in the respective drawings. Note that an X-axis shown in the drawings indicates an axis in a horizontal direction as the front view and a Y-axis is in a direction orthogonal to the X-axis and indicates an axis in a vertical direction as the front view. On the other hand, a Z-axis is based on an optical axis O of the image pickup optical system and indicates an axis in a direction that coincides with the optical axis O.

First Embodiment

Figure 2:
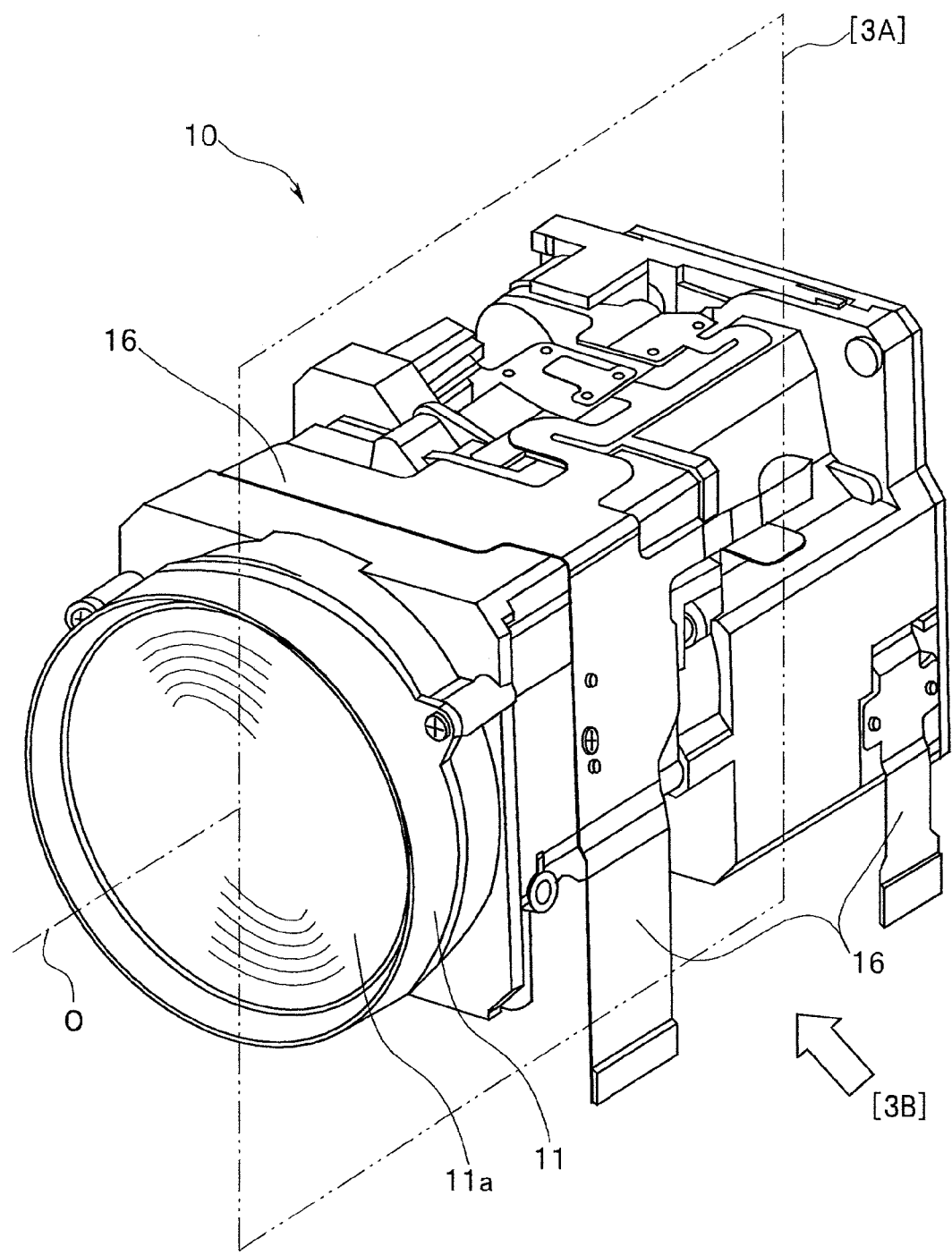
FIG. 2 is an enlarged perspective view of main parts showing an enlarged view of a principal component (camera unit) extracted from the image pickup apparatus in FIG. 1.
Figure 3:
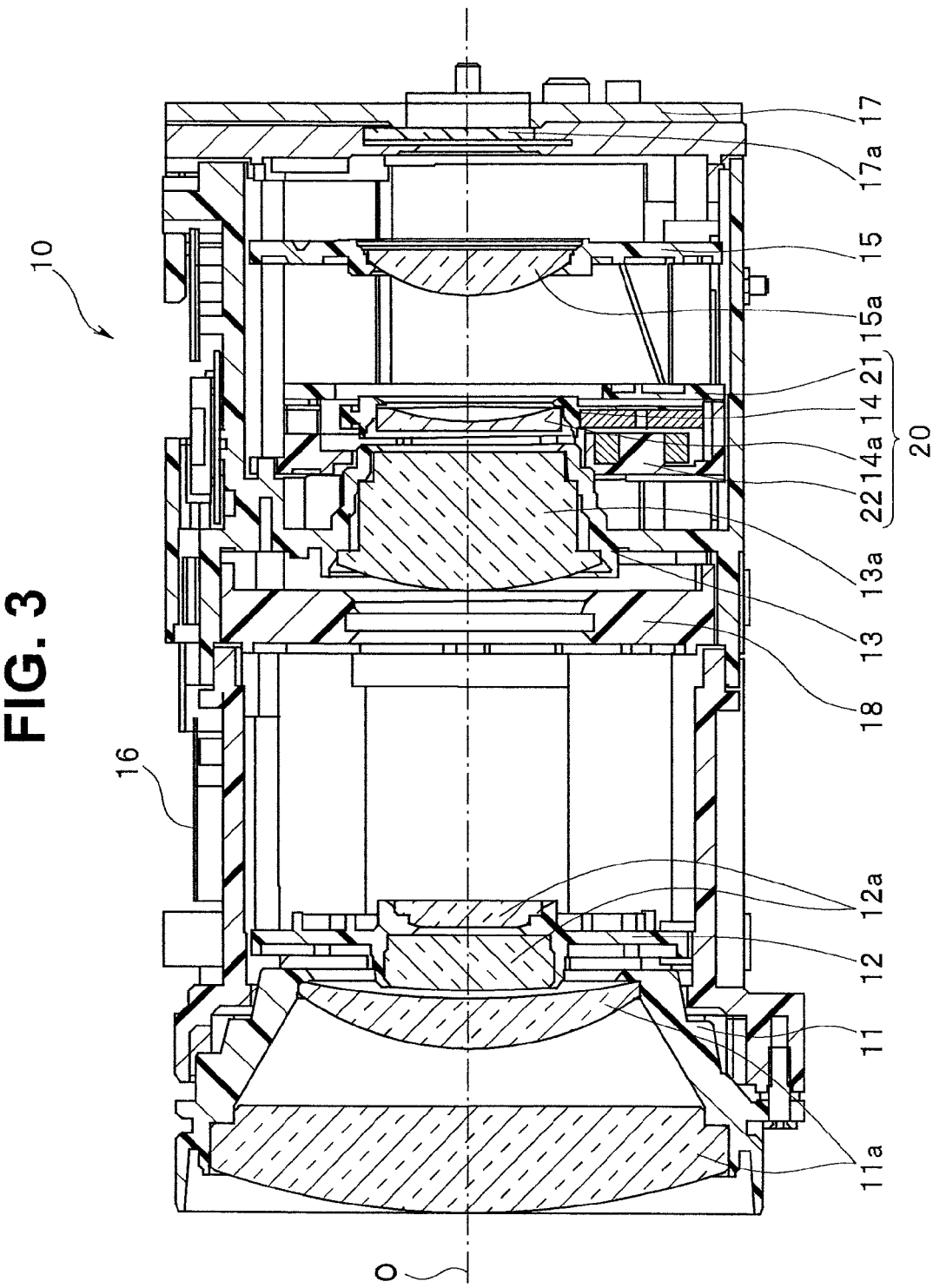
FIG. 3 is a longitudinal cross-sectional view of a cross section along a plane denoted by reference character [3A] in FIG. 2, seen from a direction shown by an arrow denoted by reference character [3B] in FIG. 2.
Figure 4:
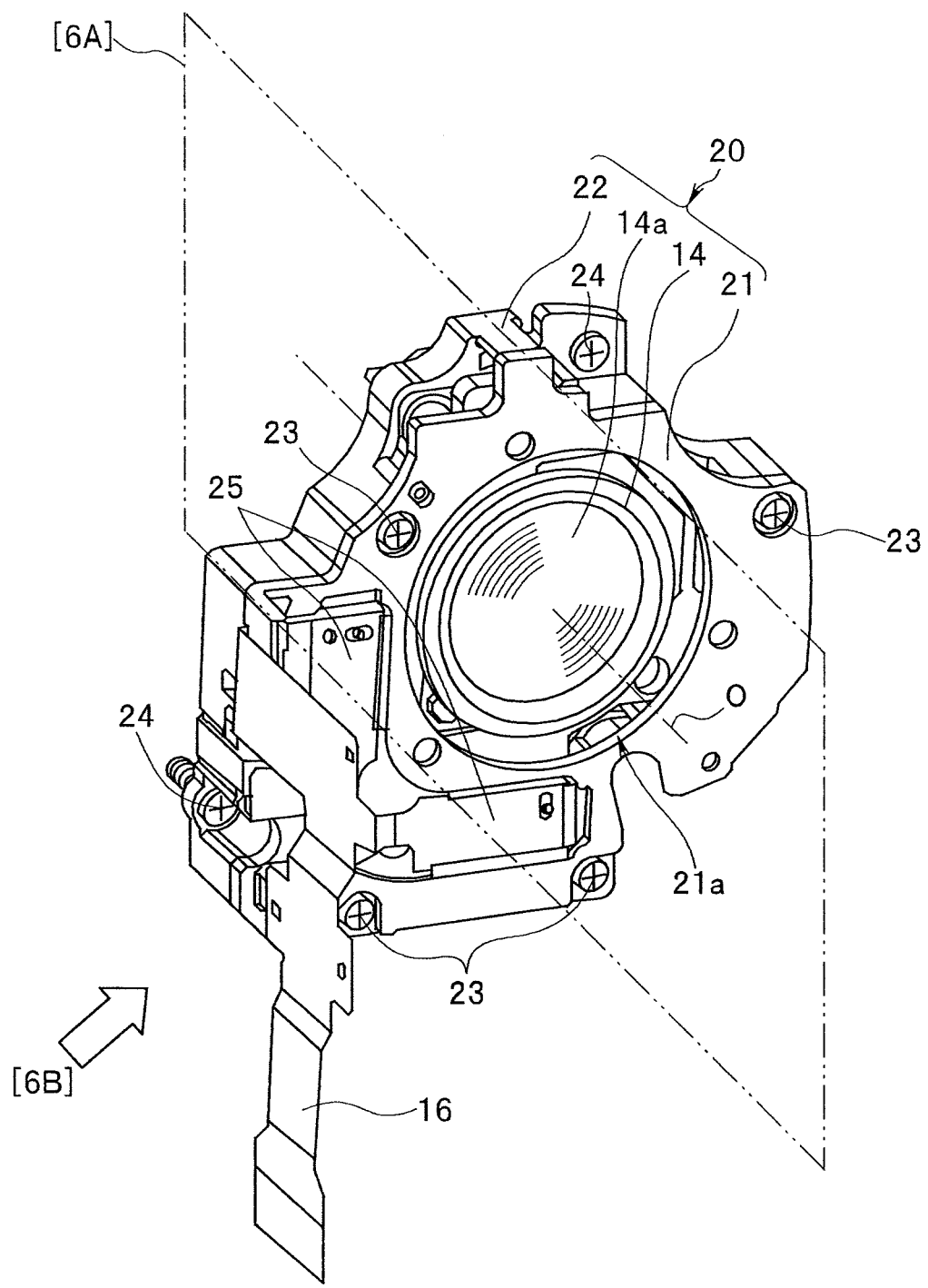
FIG. 4 is an external perspective view of an image stabilization apparatus of the present embodiment which is a principal component of the camera unit shown in FIG. 2 and FIG. 3, extracted from the camera unit.
Figure 5:
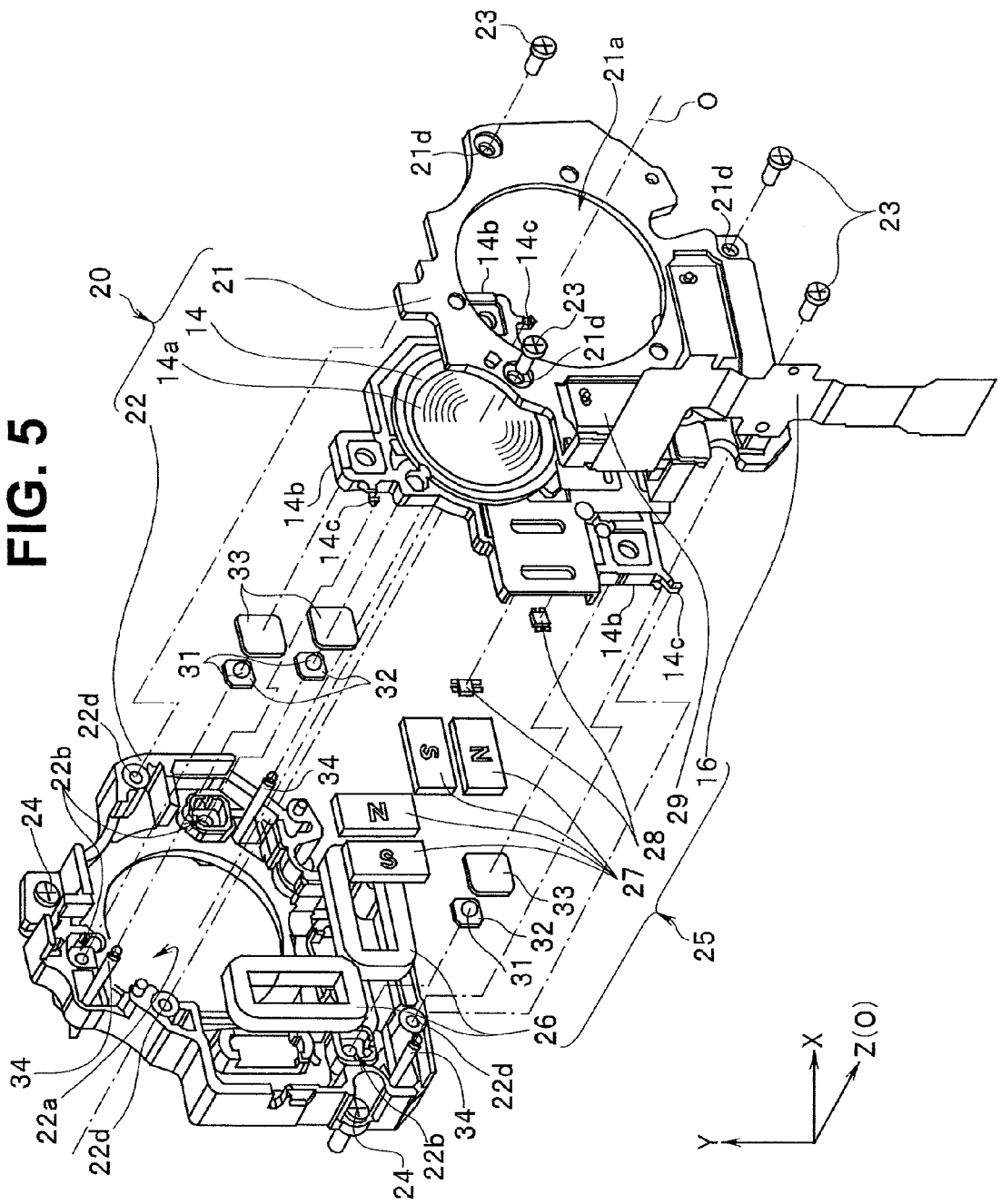
FIG. 5 is an exploded perspective view of the image stabilization apparatus in FIG. 4, taken to pieces.
Figure 6:
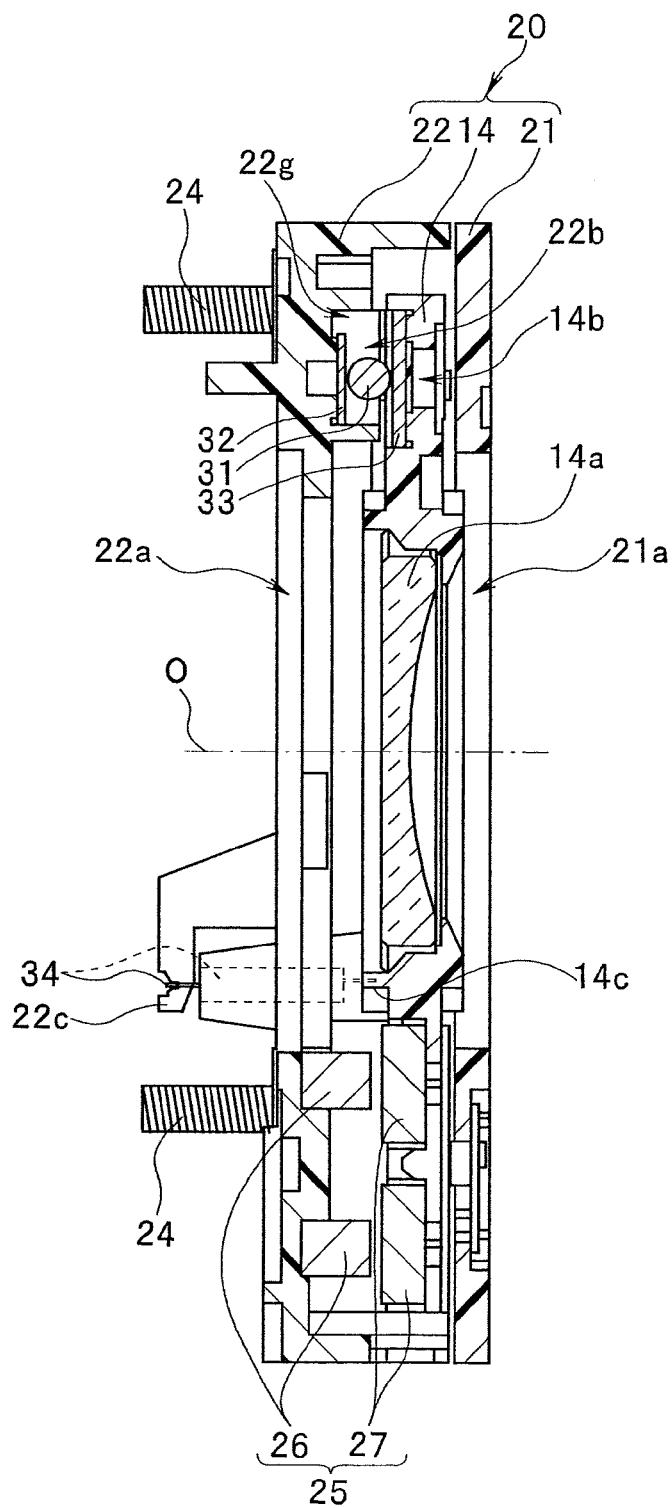
FIG. 6 is a longitudinal cross-sectional view of a cross section along a plane denoted by reference character [6A] in FIG. 4, seen from a direction shown by an arrow denoted by reference character [6B] in FIG. 4.
Figure 7:
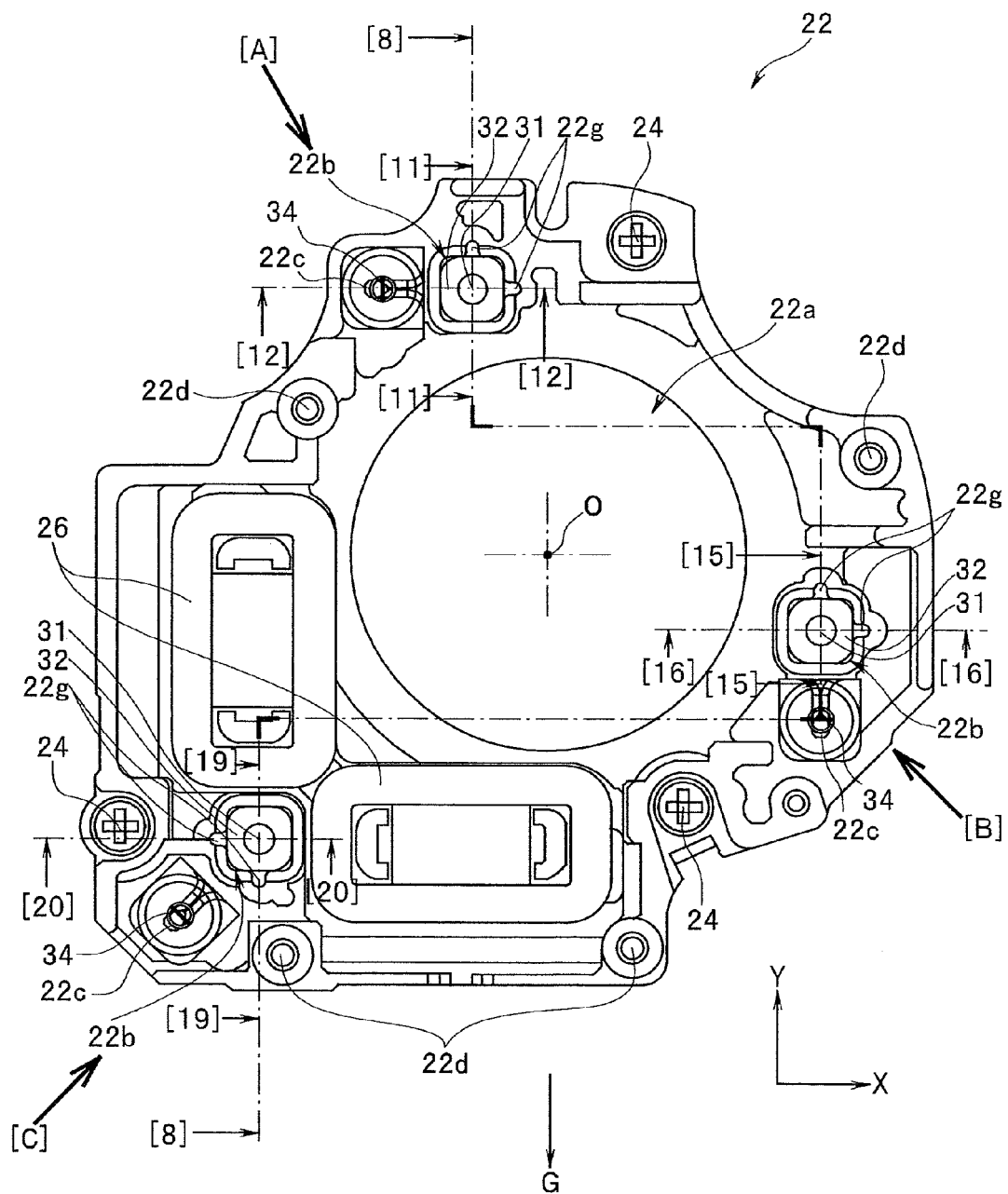
FIG. 7 is a front view illustrating an internal configuration of the image stabilization apparatus in FIG. 4 with parts of the image stabilization apparatus removed.
Figure 8:
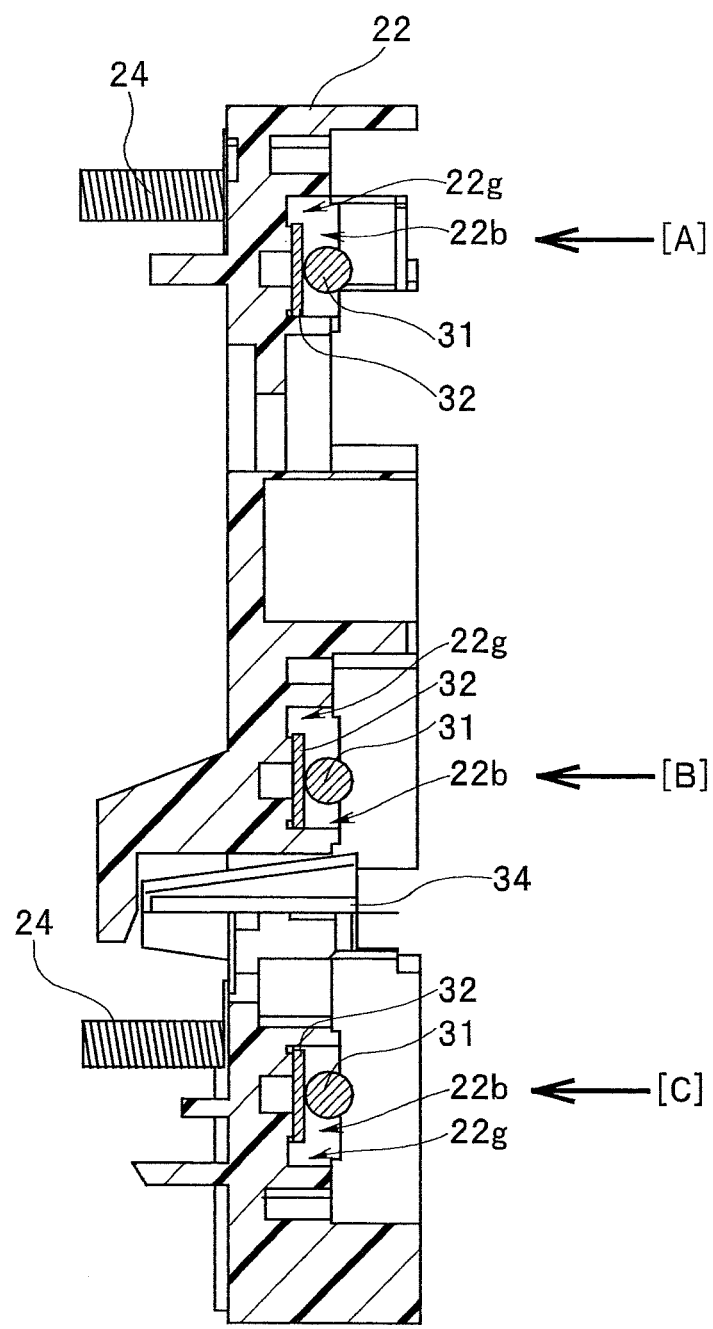
FIG. 8 is a cross-sectional view along a line denoted by reference numeral [8]-[8] in FIG. 7.

FIG. 1 to FIG. 20 are diagrams illustrating a first embodiment of the present invention. Among these drawings, FIG. 1 is an external perspective view schematically illustrating an exterior appearance of an image pickup apparatus according to the present embodiment. FIG. 2 is an enlarged perspective view of main parts showing an enlarged view of a principal component (camera unit) extracted from the image pickup apparatus in FIG. 1. FIG. 3 is a longitudinal cross-sectional view of a cross section along a plane denoted by reference character [3A] in FIG. 2, seen from a direction shown by an arrow denoted by reference character [3B] in FIG. 2. FIG. 4 is an external perspective view of an image stabilization apparatus of the present embodiment which is a principal component in the camera unit shown in FIG. 2 and FIG. 3, extracted from the camera unit. FIG. 5 is an exploded perspective view of the image stabilization apparatus in FIG. 4, taken to pieces. FIG. 6 is a longitudinal cross-sectional view of a cross section along a plane denoted by reference character [6A] in FIG. 4, seen from a direction shown by an arrow denoted by reference character [6B] in FIG. 4. FIG. 7 is a front view illustrating an internal configuration of the image stabilization apparatus in FIG. 4 with parts of the image stabilization apparatus removed. FIG. 8 is a cross-sectional view along a line denoted by reference numeral [8]-[8] in FIG. 7. FIG. 9 to FIG. 20 are enlarged views illustrating a detailed configuration of the ball disposing portion in the body member 22 of the image stabilization apparatus 20 in FIG. 4 (details of which will be described later).

First, a schematic configuration of an image pickup apparatus to which an image stabilization apparatus according to a first embodiment of the present invention is applied will be described below using mainly FIG. 1 to FIG. 3.

An image pickup apparatus 1 to which the image stabilization apparatus of the present embodiment is applied is installed and fixed, for example, outdoors or indoors on, for example, a ceiling or a wall surface or a predetermined pillar or a pedestal. The image pickup apparatus 1 is configured so as to be able to monitor a situation of a region or space to be imaged in the installation place all the time, and is an example of an image pickup apparatus included in a camera system intended for fixed-point observation, monitoring or crime prevention, or the like.

The image pickup apparatus 1 is mainly constructed of a case 2, a cover member 3 and a camera unit 10 or the like as shown in FIG. 1.

The case 2 is an exterior member having, for example, a substantially cylindrical shape and configured to accommodate and arrange the camera unit 10 inside. The case 2 is fixed to, for example, a ceiling 100.

The cover member 3 is a protective member having a substantially dome shape (semispherical shape) and configured to cover and protect part of the camera unit 10 accommodated in the case 2 and the front surface of an image pickup optical system. The cover member 3 also plays the role for securing a moving space for the image pickup optical system when changing the orientation of the optical axis O so that the camera unit 10 changes the image pickup region inside the case 2.

The camera unit 10 includes the image pickup optical system (only part of which is shown in FIG. 1, see reference numeral 11a) and an image pickup device (not shown in FIG. 1, see reference numeral 17a in FIG. 3) or the like, and is a configuration unit provided with an image pickup function. The camera unit 10 is connected to a terminal apparatus (not shown) such as a desktop type, notebook type or tablet type personal computer or a portable communication terminal apparatus called a "smartphone" or the like directly via communication means such as a wired cable or wireless, or via a network or the like which is not shown. Note that although not shown, an image display apparatus (not shown) is connected to the terminal apparatus and the image display apparatus can receive image data or video data acquired by the camera unit 10, display an image or a video or the like and display a control screen (menu screen) or the like when remotely operating the camera unit 10 using the terminal apparatus.

The camera unit 10 is configured to be able to change the orientation of the optical axis O of the image pickup optical system within an inner space of the cover member 3 as described above. That is, the camera unit 10 is provided with a predetermined rotation drive mechanism (not shown) to enable the camera unit 10 to rotate in a panning direction which is a direction along an arrow RY shown in FIG. 1 (lateral rotation, that is, rotation around the Y-axis in FIG. 1, a rotatable range of which is, for example, an angle of rotation of approximately 360 degrees) and in a tilting direction which is a direction along an arrow RX shown in FIG. 1 (longitudinal rotation, that is, rotation along the XY plane in FIG. 1, a rotatable range of which is, for example, an angle of rotation of approximately 90 to 180 degrees).

Note that since the rotation drive mechanism of the camera unit 10 is a part not directly related to the present invention, illustration and description of the rotation drive mechanism will be omitted because a mechanism similar to a conventional and generally commercialized mechanism is assumed to be applied to that part.

As shown in FIG. 2 and FIG. 3, the camera unit 10 is mainly constructed of an image pickup optical system composed of a plurality of optical lenses (11a, 12a, 13a, 14a and 15a), a plurality of lens group holding members (11, 12, 13, 14 and 15) configured to hold the plurality of optical lenses (11a, 12a, 13a, 14a and 15a) in predetermined group units, an image stabilization apparatus 20 configured to move part of the lens group holding members within a plane orthogonal to an optical axis O and thereby contribute to an image stabilization motion, a drive mechanism (not shown) configured to move others of the lens group holding members forward or backward in the direction along the optical axis O and thereby contribute to an auto focus (AF) motion or a scaling (zooming) motion, a diaphragm mechanism 18 configured to adjust a light quantity of an image pickup light flux that passes through the image pickup optical system, an image pickup substrate 17 provided with an image pickup device 17a and configured to drive the image pickup device 17a, and electric parts including a plurality of flexible printed circuit boards 16 configured to extend from the above-described drive mechanism (not shown) and the image pickup substrate 17, or the like.

The image pickup optical system of the camera unit 10 described in the present embodiment includes five lens groups of a first lens group 11a, a second lens group 12a, a third lens group 13a, a fourth lens group 14a and a fifth lens group 15a. The respective lens groups are held by a first lens group holding member 11, a second lens group holding member 12, a third lens group holding member 13, a fourth lens group holding member 14 and a fifth lens group holding member 15 respectively.

Among these lens group holding members, the fourth lens group holding member 14 is sandwiched between a body member 22 and a cover member 21 which are main components making up the image stabilization apparatus 20 of the present embodiment. The image stabilization apparatus 20 of the present embodiment performs image stabilization by causing the fourth lens group 14a held by the fourth lens group holding member 14 to move within a plane along the optical axis O of the image pickup optical system through action of an image stabilization drive unit 25 (see FIG. 4 or the like) which will be described later.

Note that a high magnification zooming optical system (zoom lens) having optical magnification of, for example, approximately ×20 to ×30 is used as the image pickup optical system of the camera unit 10. Note that the image pickup optical system is not limited to this, but, for example, a fixed focus type optical system (e.g., fish-eye lens) may be used or a variable focus type (varifocal lens) optical system may be used. Certainly, a still higher magnification zoom optical system (zoom lens) such as optical magnification of ×50 may also be adopted.

An overview of the configuration of the camera unit 10 has been presented so far. Since various components of the camera unit 10 other than the aforementioned components, for example, the drive mechanism (not shown) contributing to an AF motion or a zoom motion and various electric parts including the diaphragm mechanism 18 and the flexible printed circuit board 16 or the like are parts not directly related to the present invention, detailed description of the parts will be omitted because components similar to conventional, generally commercialized components are assumed to be applied to the parts.

Next, a configuration of the image stabilization apparatus 20 of the present embodiment will be described using mainly FIG. 4 to FIG. 8 and FIG. 9 to FIG. 20. Of these drawings, FIG. 4, FIG. 5 and FIG. 6 illustrate an overall configuration of the image stabilization apparatus 20. FIG. 7 and FIG. 8 illustrate an internal configuration (various components disposed in the body member 22) of the image stabilization apparatus 20 from which the cover member 21 is removed.

The configurations of main parts of the image stabilization apparatus 20 of the present embodiment will be described below using mainly FIG. 4 to FIG. 8.

The image stabilization apparatus 20 according to the present embodiment is provided with a so-called lens shift type optical image stabilization mechanism configured to perform image stabilization by moving part of optical lenses making up the image pickup optical system within a plane along the optical axis O of the image pickup optical system. Note that a basic configuration of the image stabilization apparatus 20 of the present embodiment is substantially similar to configuration of conventional image stabilization apparatuses of a similar type.

The image stabilization apparatus 20 of the present embodiment is mainly constructed of the body member 22 which is a fixed barrel member, the cover member 21, the image stabilization drive unit 25, part of the optical lenses making up the image pickup optical system (fourth lens group 14a) and the fourth lens group holding member 14 which is a movable barrel member configured to hold the fourth lens group 14a, or the like.

The body member 22 is a basic component and a fixed barrel member of the image stabilization apparatus 20. Based on the body member 22, various components are arranged and fixed at their respective predetermined positions. An opening 22a configured to pass an object light flux transmitting through the image pickup optical system is formed in a substantially central part of the body member 22.

The cover member 21 is disposed so as to cover one side of the body member 22 and provided to protect, fix and support the various components disposed between the body member 22 and the cover member 21. The cover member 21 is fixed to the body member 22 using, for example, a plurality of (four in the present embodiment) screws 23. For the purpose, a plurality of (four) screw insertion holes 21d are formed in the cover member 21. Correspondingly, a plurality of (four) screw holes 22d are formed in the body member 22 (see FIG. 5). The opening 22a configured to pass an object light flux transmitting through the image pickup optical system is formed in a substantially central part of the cover member 21.

When the body member 22 and the cover member 21 are fixed and assembled together using the screws 23 or the like in this way, the fourth lens group holding member 14 which is a movable barrel member configured to hold the fourth lens group 14a is movably disposed within the plane orthogonal to the optical axis O between both members (the body member 22 and the cover member 21). A substantially circular opening portion is formed in a substantially central part of the fourth lens group holding member 14 and the substantially circular fourth lens group 14a is disposed and fixed in the opening portion. The fourth lens group 14a is disposed at positions facing the opening 22a of the body member 22 and the opening 21a of the cover member 21 respectively. In other words, the fourth lens group 14a, the body member 22 and the cover member 21 are disposed such that the optical axis O of the fourth lens group 14a, the substantially central axis of the opening 22a and the substantially central axis of the opening 21a all substantially coincide with each other.

As described above, the fourth lens group holding member 14 that holds the fourth lens group 14a to the body member 22 is a movable barrel member configured to be movable within the plane orthogonal to the optical axis O of the image pickup optical system. For this reason, first of all, the body member 22 and the fourth lens group holding member 14 are coupled together via a plurality of (three in the present embodiment) taut urging springs 34. The plurality of urging springs 34 are stretched between the body member 22 and the fourth lens group holding member 14 so as to expand or contract in a direction parallel to the optical axis O. That is, a plurality of (three) spring hook portions 22c (see FIG. 6) are formed in the body member 22 and the same number of (three) spring hook portions 14c are formed at positions on the fourth lens group holding member 14 side corresponding to them (see FIG. 5). As shown in FIG. 6, one end of the urging spring 34 is hooked to the spring hook portion 22c and the other end is hooked to the spring hook portion 14c. Thus, the fourth lens group holding member 14 which is a movable barrel member is urged with respect to the body member 22 as a fixed barrel member in a direction along the optical axis O. In this condition, the fourth lens group holding member 14 has such a degree of freedom that it can move within the plane orthogonal to the optical axis O.

With the fourth lens group holding member 14 (movable barrel member) coupled with the body member 22 (fixed barrel member) while being urged by the plurality of urging springs 34 in a direction parallel to the optical axis O, a plurality of (at least three) ceramic balls 31 are interposed between both members (between the body member 22 and the fourth lens group holding member 14). The ceramic balls 31 are provided to smooth the movement of the fourth lens group holding member 14 with respect to the body member 22 within the plane orthogonal to the optical axis O. Here, the ceramic balls 31 function as support members to movably support the fourth lens group holding member 14 to the body member 22. Note that although the ceramic balls 31 are used to avoid influences of magnets in the present embodiment, if the magnets do not have any influence, the ceramic balls 31 may be substituted by steel balls.

For that reason, a plurality of (three in the present embodiment) ball disposing portions 22b are formed at predetermined positions in an outer circumferential edge portion region of the opening 22a of the body member 22. Each of the ball disposing portions 22b is a support member disposing portion configured to form a housing space to rotatably house each of the ceramic balls 31 within a predetermined range and limit an amount of movement of the ceramic ball 31 within the plane. A ball receiving plate 32 formed into a substantially rectangular shape using, for example, a metallic flat plate member such as stainless steel is disposed in a region which becomes a bottom surface portion of the ball disposing portion 22b, that is, the flat surface of the body member 22 (surface orthogonal to the optical axis O), the surface that receives the ceramic ball 31. The body member 22 has a wall surface that extends from a peripheral edge portion toward a direction along the optical axis O so as to surround the ball receiving plate 32 (see FIG. 5 or the like). In this way, the ball disposing portion 22b forms a box-like shape with the bottom surface portion and the wall surface portion, with the surface opposite to the bottom surface portion being open.

On the other hand, as described above, when the fourth lens group holding member 14 is disposed so as to superimpose on the body member 22 at a predetermined normal position, the fourth lens group holding member 14 is provided with a plurality of (three in the present embodiment) ball receiving portions 14b formed at respective positions facing the plurality of (three in the present embodiment) ball disposing portions 22b respectively which are outer circumferential edge portion regions of the opening portion in which the fourth lens group 14a is disposed. Substantially rectangular ball receiving plates 33 using a metallic flat plate member or the like made of the same material as that of the ball receiving plates 32 are accommodated in the respective ball receiving portions 14b. The respective ball receiving plates 33 are arranged so as to cover the respective openings of the plurality of ball disposing portions 22b in this state (that is, a state in which the body member 22 and the fourth lens group holding member 14 are superimposed one on another at a predetermined normal position) (see FIG. 6). In this case, one of the ceramic balls 31 is accommodated in each of the plurality of ball disposing portions 22b. With the configuration, the ceramic ball 31 rotates while being sandwiched between the ball receiving plates 32 and 33 inside the ball disposing portion 22b. This makes the movement of the fourth lens group holding member 14 (movable barrel member) smooth with respect to the body member 22 (fixed barrel member) within the plane orthogonal to the optical axis O.

Note that a case has been described in the present embodiment where three ball disposing portions 22b and three ball receiving portions 14b are provided. In this case, the ball disposing portions 22b and the ball receiving portions 14b are preferably arranged at substantially equal intervals in a circumferential direction around the central axis (that is, a virtual axis that coincides with the optical axis O) of the opening 22a. The present embodiment shows an example where the ball disposing portions 22b and the ball receiving portions 14b are provided around the optical axis O at a substantially 120-degree interval.

Furthermore, for example, a pair of coils 26 which are members making up part of the image stabilization drive unit 25 are disposed and fixed in the outer circumferential edge region of the opening 22a of the body member 22. Here, one of the pair of coils 26 is a member configured to contribute to the movement of the fourth lens group holding member 14 (movable barrel member) in a direction along the X-axis and disposed along the X-axis. The other of the pair of coils 26 is a member configured to contribute to the movement of the fourth lens group holding member 14 (movable barrel member) in a direction along the Y-axis and disposed along the Y-axis.

Correspondingly, magnets 27 which are paired by combining two (see FIG. 5 and FIG. 6) are fixed at respective positions facing each of the pair of coils 26 respectively on the fourth lens group holding member 14 side. That is, the set of two magnets 27 are disposed for each coil 26 such that each magnetic pole is oriented toward a predetermined direction.

Furthermore, magnetic sensors 28 made of a hall element or the like (see FIG. 5) are disposed in the vicinity of the respective magnets 27 in the fourth lens group holding member 14. The magnets 27 and the magnetic sensors 28 are members making up another part of the image stabilization drive unit 25. Various components other than those described above exist, but since such components are not directly related to the present invention, illustration and description of the components will be omitted.

The image stabilization apparatus 20 configured as described above is disposed and fixed at a predetermined position as part of the camera unit 10 as shown in FIG. 3. In this case, the image stabilization apparatus 20 is fixed to a predetermined fixed portion in the camera unit 10 using, for example, a plurality of screws 24 (three in the present embodiment).

The plurality of ball disposing portions 22b are each provided with a grease reserve portion 22g formed by notching part of the wall surface. Here, the grease reserve portion 22g will be described in detail below using mainly FIG. 7, FIG. 8 and FIG. 9 to FIG. 20.

Figure 9:
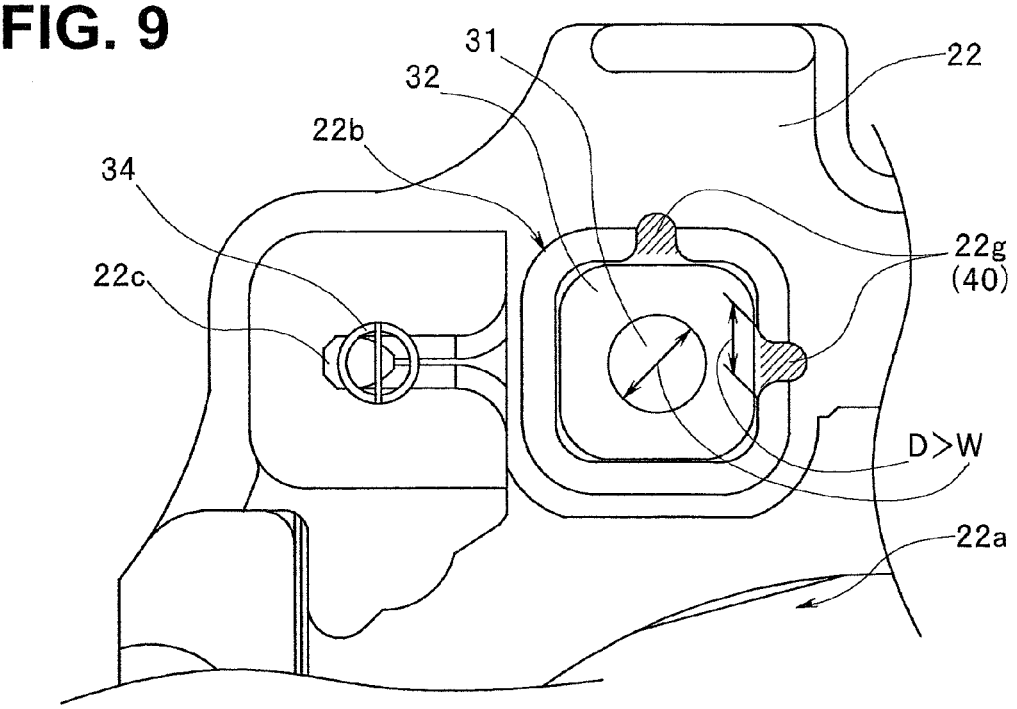
FIG. 9 is an enlarged plan view of main parts seen from the front, illustrating a detailed configuration of a ball disposing portion in the vicinity of the region denoted by reference character [A] in FIG. 7 and FIG. 8 of the ball disposing portion in the body member of the image stabilization apparatus in FIG. 4.
Figure 10:
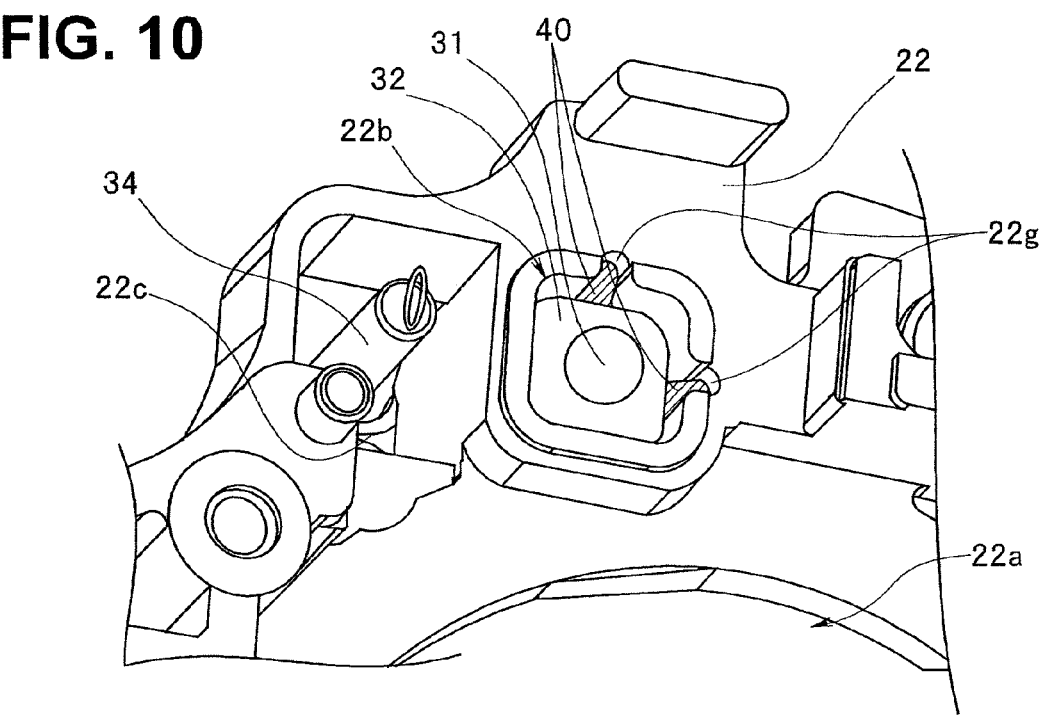
FIG. 10 is an enlarged perspective view of main parts in FIG. 9 seen from a diagonal direction.
Figure 11:
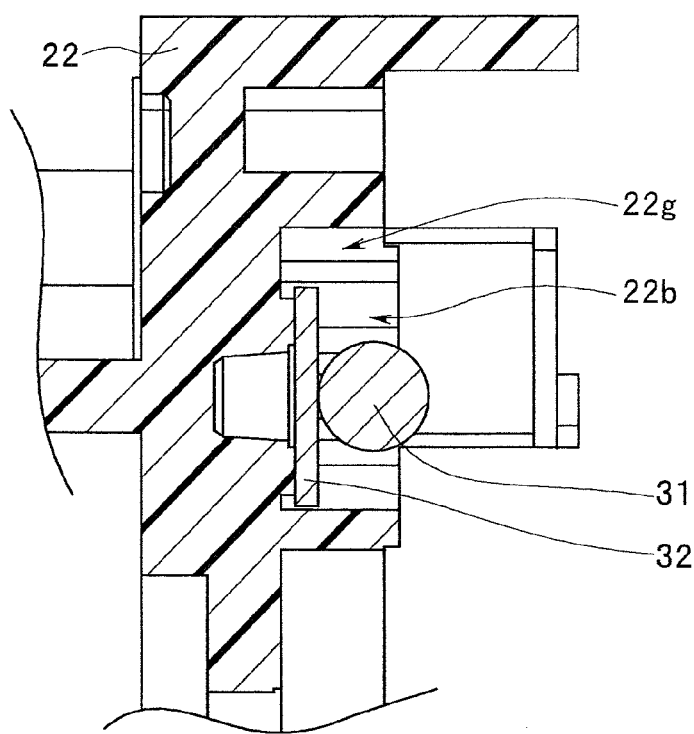
FIG. 11 is a partial cross-sectional view along a line denoted by reference numeral [11]-[11] in FIG. 7.
Figure 12:
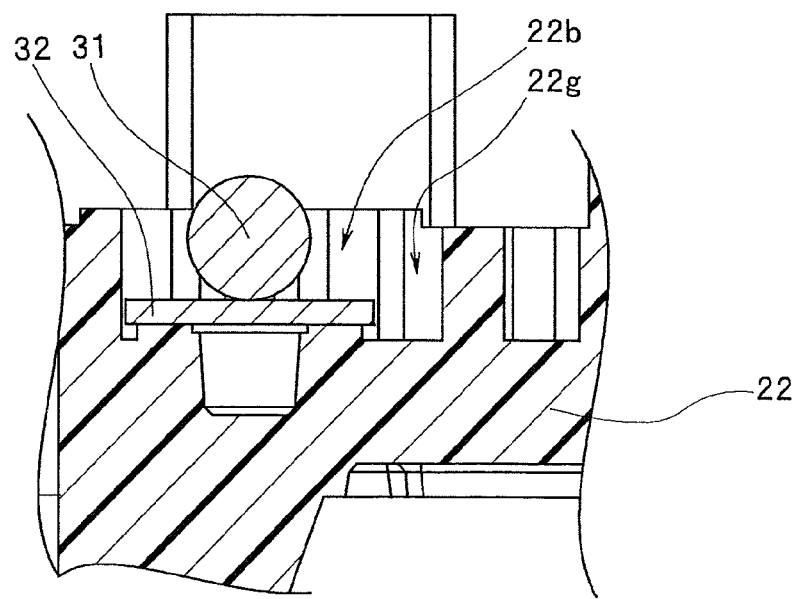
FIG. 12 is a partial cross-sectional view along a line denoted by reference numeral [12]-[12] in FIG. 7.

Note that FIG. 9 to FIG. 20 are enlarged views illustrating a detailed configuration of the ball disposing portion in the body member 22 of the image stabilization apparatus 20 in FIG. 4. Among the drawings, FIG. 9 to FIG. 12 are diagrams illustrating details of the ball disposing portion in the vicinity of the region denoted by reference character [A] in FIG. 7 and FIG. 8. Among them, FIG. 9 is an enlarged plan view of main parts seen from the front and FIG. 10 is an enlarged perspective view of main parts in FIG. 9 seen from a diagonal direction. FIG. 11 is a partial cross-sectional view along a line denoted by reference numeral [11]-[11] in FIG. 7. FIG. 12 is a partial cross-sectional view along a line denoted by reference numeral [12]-[12] in FIG. 7.

Figure 13:
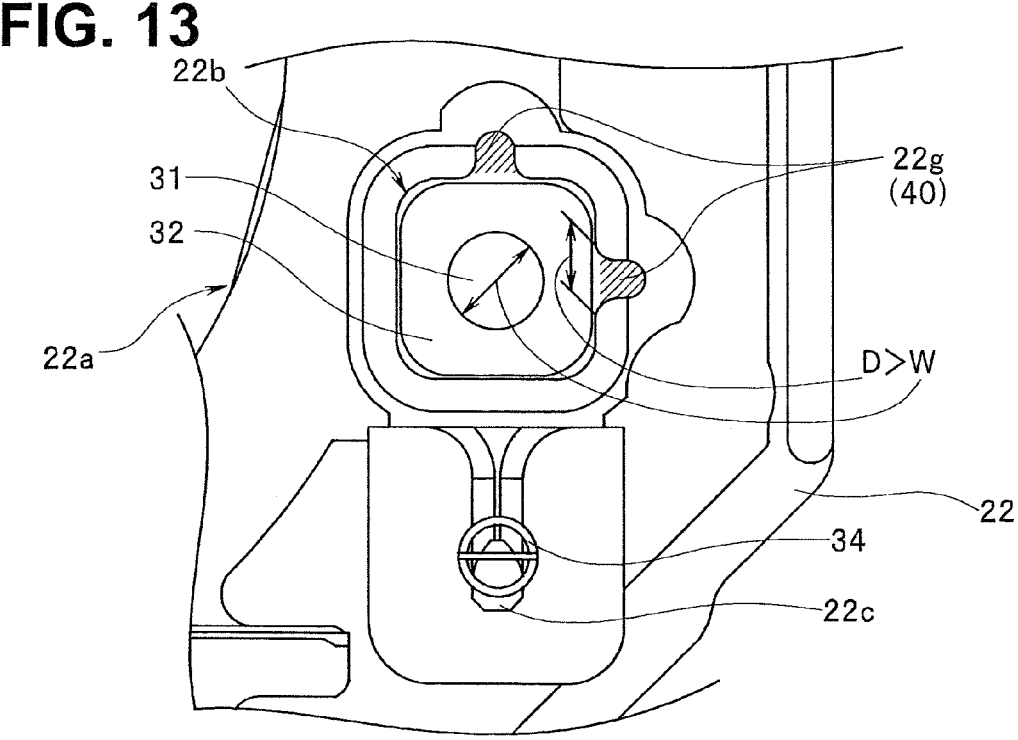
FIG. 13 is an enlarged plan view of main parts seen from the front, illustrating a detailed configuration of the ball disposing portion in the vicinity of the region denoted by reference character [B] in FIG. 7 and FIG. 8 of the ball disposing portion in the body member of the image stabilization apparatus in FIG. 4.
Figure 14:
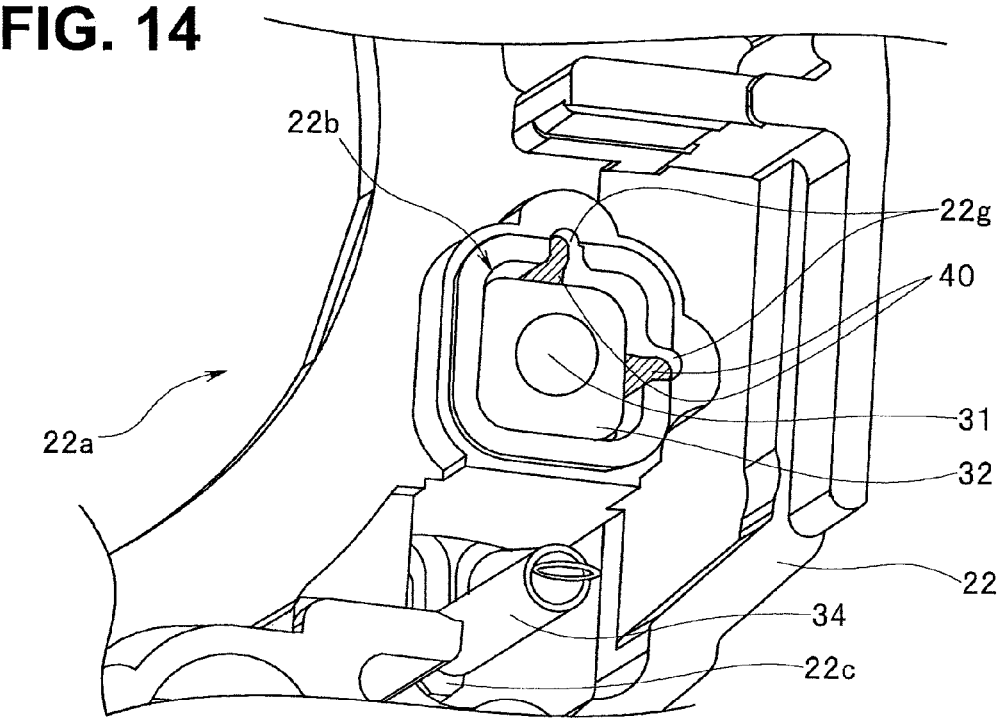
FIG. 14 is an enlarged perspective view of main parts in FIG. 13 seen from a diagonal direction.
Figure 15:
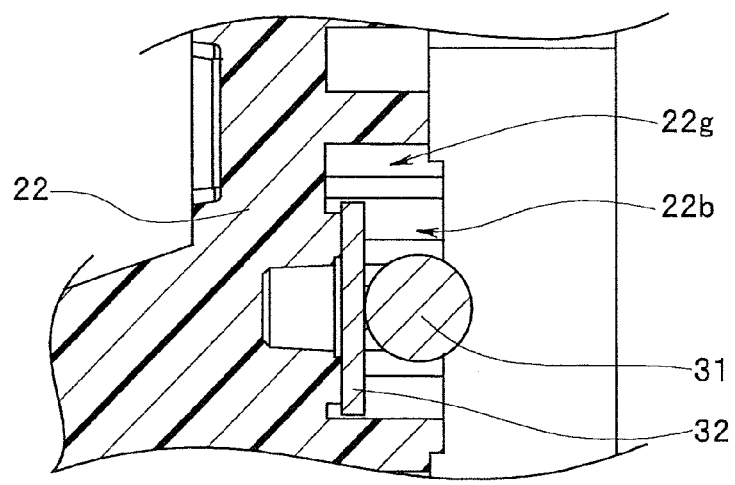
FIG. 15 is a partial cross-sectional view along a line denoted by reference numeral [15]-[15] in FIG. 7.
Figure 16:
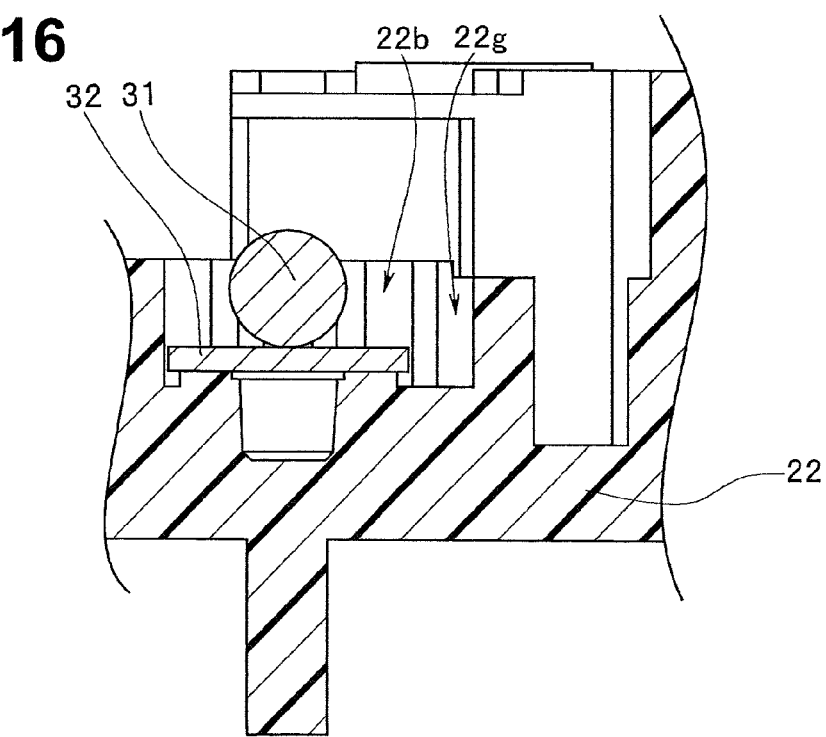
FIG. 16 is a partial cross-sectional view along a line denoted by reference numeral [16]-[16] in FIG. 7.
Figure 17:
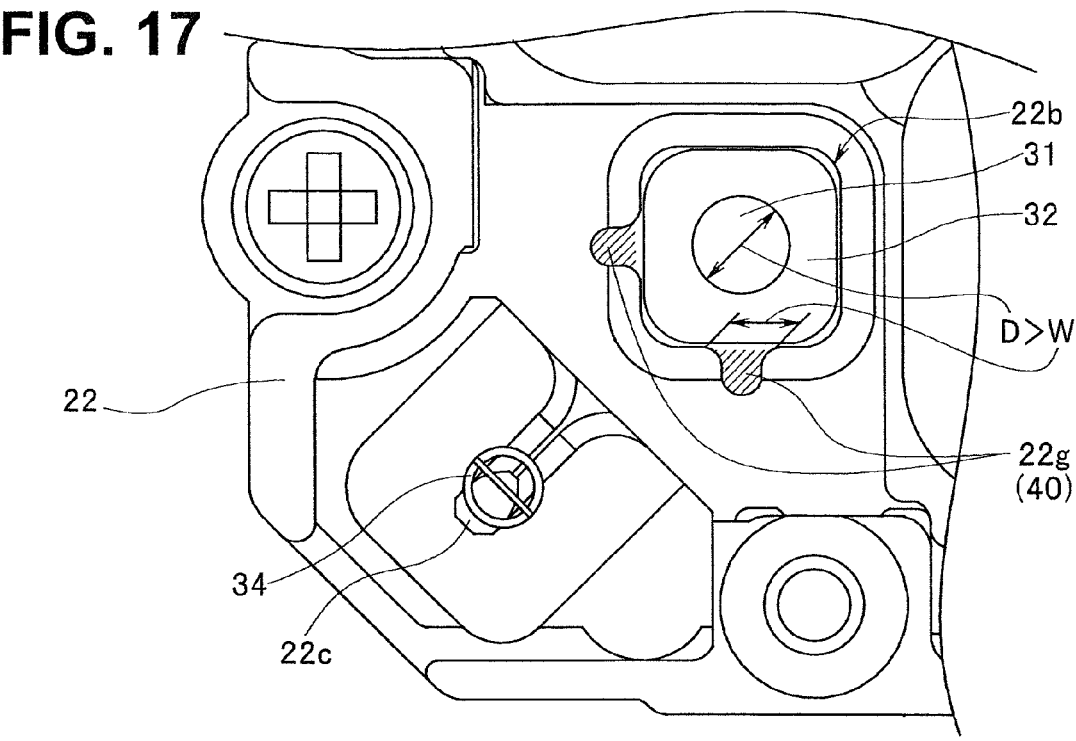
FIG. 17 is an enlarged plan view of main parts seen from the front, illustrating a detailed configuration of the ball disposing portion in the vicinity of the region denoted by reference character [C] in FIG. 7 and FIG. 8 of the ball disposing portion in the body member of the image stabilization apparatus in FIG. 4.
Figure 18:
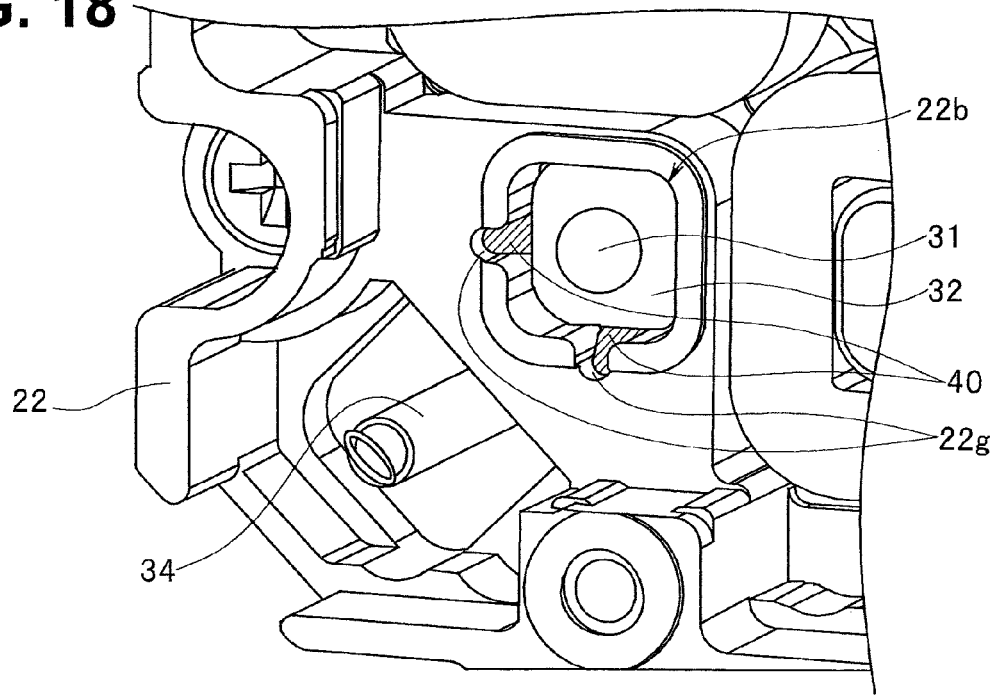
FIG. 18 is an enlarged perspective view of main parts in FIG. 17 seen from a diagonal direction.
Figure 19:
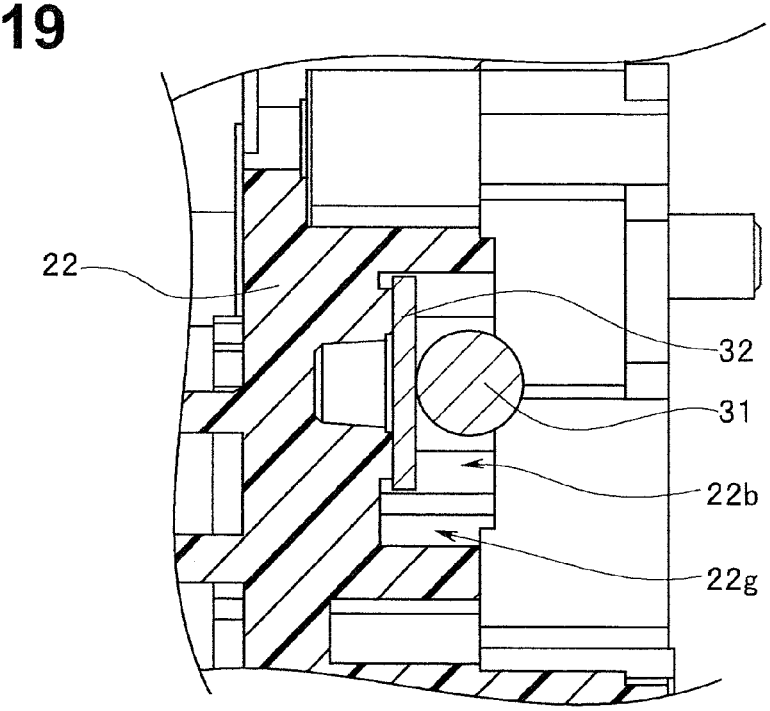
FIG. 19 is a partial cross-sectional view along a line denoted by reference numeral [19]-[19] in FIG. 7.
Figure 20:
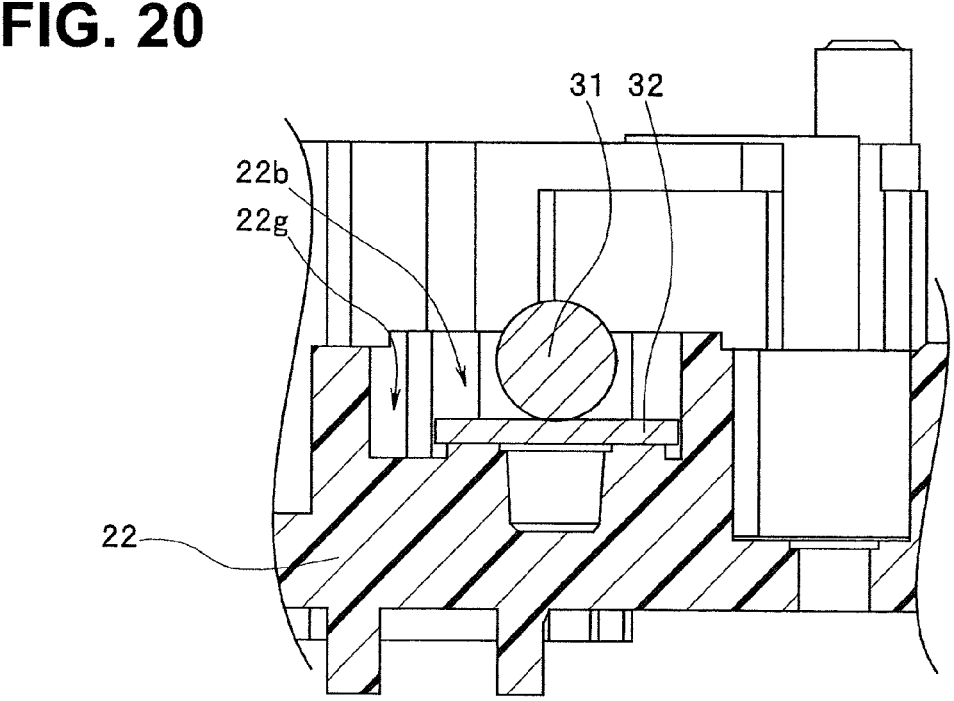
FIG. 20 is a partial cross-sectional view along a line denoted by reference numeral [20]-[20] in FIG. 7.

FIG. 13 to FIG. 16 are diagrams illustrating details of the ball disposing portion in the vicinity of the region denoted by reference character [B] in FIG. 7 and FIG. 8. Among them, FIG. 13 is an enlarged plan view of main parts seen from the front, FIG. 14 is an enlarged perspective view of main parts in FIG. 13 seen from a diagonal direction and FIG. 15 is a partial cross-sectional view along a line denoted by reference numeral [15]-[15] in FIG. 7. FIG. 16 is a partial cross-sectional view along a line denoted by reference numeral [16]-[16] in FIG. 7. FIG. 17 to FIG. 20 are diagrams illustrating details of the ball disposing portion in the vicinity of the region denoted by reference character [C] in FIG. 7 and FIG. 8. Among them, FIG. 17 is an enlarged plan view of main parts seen from the front, FIG. 18 is an enlarged perspective view of main parts in FIG. 17 seen from a diagonal direction and FIG. 19 is a partial cross-sectional view along a line denoted by reference numeral [19]-[19] in FIG. 7. FIG. 20 is a partial cross-sectional view along a line denoted by reference numeral [20]-[20] in FIG. 7.

Note that FIG. 9, FIG. 10, FIG. 13, FIG. 14, FIG. 17 and FIG. 18 show situations in which each grease reserve portion 22g is filled with grease 40. For this reason, the region where the grease 40 is provided is shown using hatched lines in the drawings.

The grease reserve portion 22g is formed by notching part of the wall surface of the ball disposing portion 22b, as a small spatial region portion that communicates with an inner space of the ball disposing portion 22b.

A width of an opening W of the notched portion of the wall surface of the ball disposing portion 22b that communicates with the grease reserve portion 22g is set to be smaller than a diameter D of the ceramic ball 31 accommodated in the ball disposing portion 22b (D>W; see FIG. 9, FIG. 13 and FIG. 17). The configuration prevents the ceramic ball 31 from going through the opening of the notched portion and also prevents the ceramic ball 31 from entering the small spatial region portion of the grease reserve portion 22g. Each of the grease reserve portions 22g is filled with a lubrication member such as the grease 40.

Note that the grease reserve portion 22g together with the ball disposing portion 22b is also formed in the ball receiving portion 14b of the fourth lens group holding member 14 which is disposed at a position facing the ball disposing portion 22b in a similar manner.

In a normal condition, the grease 40 for smoothing the rotation of the ceramic ball 31 inside the ball disposing portion 22b is applied to the ceramic ball 31 and the surfaces of the ball receiving plates 32 and 33 with which the ceramic ball 31 comes into contact during manufacturing or assembly so as to form a film on their surfaces. However, once the use of the grease 40 is started, the film attached to sliding surfaces of the ball receiving plates 32 and 33 becomes thinner due to influences of a high temperature or the like and rotation of the ceramic ball 31, and is eventually exhausted. Therefore, in this type of apparatus, grease should be preferably replenished periodically.

As described above, as long as grease is applied to surfaces of the ceramic ball 31 and the ball receiving plates 32 and 33, the quantity of the applied grease is limited, and it is difficult to use the apparatus for a long period of time without replenishment of grease. For example, the image pickup apparatus 1 included in a camera system intended for fixed-point observation, monitoring or crime prevention is often operated continuously and for a long period of time, and replenishment of grease is essential. However, it is necessary to disassemble the camera unit 10 to replenish grease and replenishing of grease is not an easy task.

With this point taken into consideration, when, for example, the interior of the ball disposing portion 22b is filled with a large quantity of grease 40, the motion of the ceramic ball 31 rotating inside the ball disposing portion 22b may be impaired, leading to a failure in securing the desired image stabilization function.

Therefore, the image stabilization apparatus 20 of the present embodiment is provided with the grease reserve portion 22g made up of a small spatial region portion communicating with the ball disposing portion 22b that accommodates the ceramic ball 31 and configured to fill the grease reserve portion 22g with grease 40. In such a configuration, the grease 40 filling the grease reserve portion 22g is gradually supplied from the grease reserve portion 22g to the interior of the ball disposing portion 22b for a long period of time. In this way, it is possible to secure the function of lubricating the ceramic ball 31 with the grease 40 stably and for a long period of time. Therefore, it is possible to secure smooth motion of the fourth lens group holding member 14 (movable barrel member) with respect to the body member 22 (fixed barrel member) in the image stabilization apparatus 20.

Here, the grease reserve portion 22g is disposed in the ball disposing portion 22b in the image stabilization apparatus 20 of the present embodiment more specifically as follows.

Note that the attitude when the camera unit 10 mounted with the image stabilization apparatus 20 is at a normal attitude is assumed to be a reference attitude and the normal attitude is assumed to indicate a case where the image stabilization apparatus 20 is in the state shown in FIG. 7. In FIG. 7, the direction along the Y-axis and indicated by an arrow G is assumed to be a vertical direction (direction of gravity).

In this case, the grease reserve portions 22g are formed at two locations of the ball disposing portion 22b shown by reference characters [A] and [B] in FIG. 7 and FIG. 8 by notching respective parts of two wall surfaces having relatively wide regions on the outer circumferential side of the wall surfaces forming the ball disposing portions 22b as shown in FIG. 9 to FIG. 16. In this case, when the image stabilization apparatus 20 is seen from the front, the grease reserve portions 22g are provided at one location on an upper wall surface and at one location on a one side wall surface in the vertical direction centered on the ceramic ball 31 inside the ball disposing portion 22b. In such a configuration, the grease 40 filling the grease reserve portions 22g is naturally supplied by gravity to an interior of the ball disposing portion 22b located on a lower side or on a lateral side.

On the other hand, the grease reserve portions 22g are likewise formed at two locations of the ball disposing portion 22b shown by reference character [C] in FIG. 7 and FIG. 8 by notching respective parts of two wall surfaces having relatively wide regions on the outer circumferential side of the wall surfaces forming the ball disposing portions 22b as shown in FIG. 17 to FIG. 20. In this case, when the image stabilization apparatus 20 is seen from the front, the grease reserve portions 22g are provided at one location on a lower wall surface and at one location on a one side wall surface in the vertical direction centered on the ceramic ball 31 inside the ball disposing portion 22b. In such a configuration, the grease 40 filling the grease reserve portions 22g is also gradually supplied to the interior of the ball disposing portion 22b located on an upper side or on a lateral side.

As described above, according to the first embodiment, the image stabilization apparatus 20 is provided with the grease reserve portions 22g made up of a small spatial region portion communicated by notching parts of wall surfaces of the ball disposing portion 22b to supply the grease 40 to the ball disposing portion 22b for accommodating and arranging the support member (ceramic ball 31) to support the movable barrel member (fourth lens group holding member 14) to allow smooth movement with respect to the fixed barrel member (body member 22) and configured to fill the grease reserve portions 22g with the grease 40.

With such a configuration, the grease 40 filling the grease reserve portions 22g is gradually supplied from the grease reserve portions 22g to the interior of the ball disposing portion 22b for a long period of time, and it is thereby possible to stably secure the function of lubricating the ceramic ball 31 with the grease 40. The image stabilization apparatus 20 can secure smooth movement of the fourth lens group holding member 14 (movable barrel member) with respect to the body member 22 (fixed barrel member) for a long period of time.

According to the configuration of the present embodiment, that is, the configuration provided with the grease reserve portions 22g, a greater amount of grease 40 is charged in advance during manufacturing compared to the prior art without any grease reserve portion and the grease 40 is gradually supplied to predetermined regions during operation of the image pickup apparatus 1. Therefore, continuous operation for a long period of time is easily made possible compared to the prior art.

Second Embodiment

Figure 21:
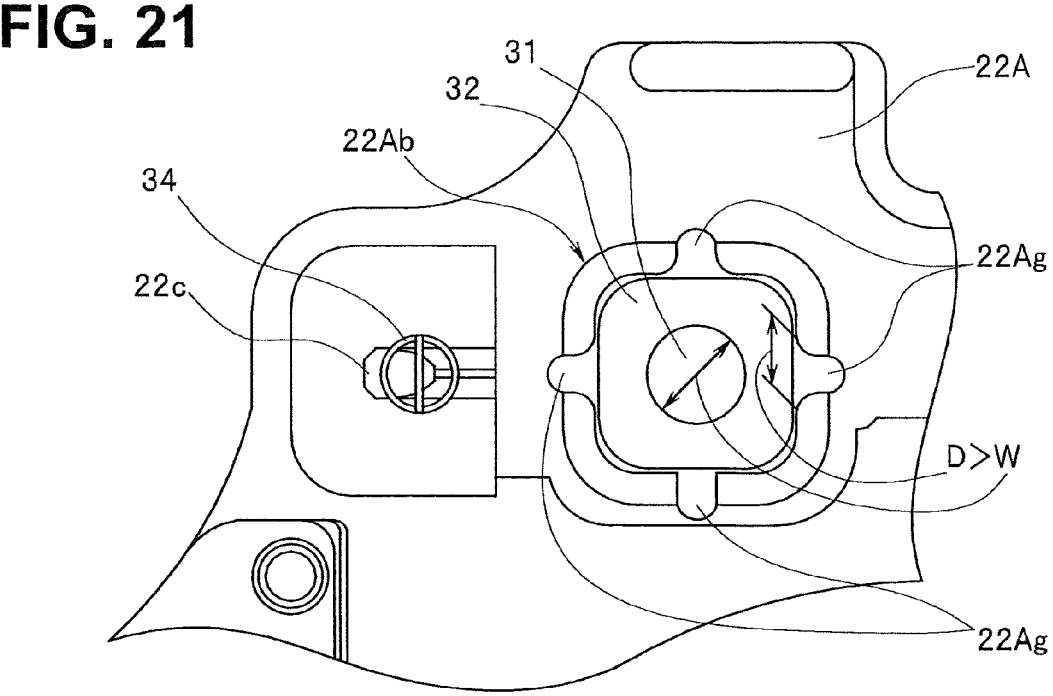
FIG. 21 is an enlarged view of main parts showing an enlarged view of the vicinity of the ball disposing portion when an image stabilization apparatus according to a second embodiment of the present invention is seen from the front.

FIG. 21 is an enlarged view of main parts showing an enlarged view of the vicinity of the ball disposing portion when an image stabilization apparatus according to a second embodiment of the present invention is seen from the front.

A basic configuration of the image stabilization apparatus of the present embodiment is substantially similar to that of the aforementioned first embodiment. The present embodiment is only different in that grease reserve portions communicating with the ball disposing portion and made up of a small spatial region portion are provided at four locations. The rest of the configuration is the same as that of the aforementioned first embodiment. Therefore, the same components are assigned the same reference numerals and detailed description is omitted.

In the present embodiment, four grease reserve portions 22Ag are formed by notching respective parts of four wall surfaces of the ball disposing portion 22Ab. With such a configuration, it is possible to increase the amount of grease 40 charged into the grease reserve portions 22Ag compared to the first embodiment and thereby secure the function of lubricating the ceramic ball 31 with the grease 40 stably for a longer period of time.

In the present embodiment, a total of four grease reserve portions 22Ag; two on the two wall surfaces of the ball disposing portion 22Ab in the vertical direction and two on the two wall surfaces in a direction orthogonal to the vertical direction are provided as shown in FIG. 21. Therefore, even when the camera unit 10 mounted with the image stabilization apparatus 20 is driven and its attitude is changed during use, such an attitude change will not cause any difference in a supply of the grease 40 to the ball disposing portion 22Ab.

Therefore, it is possible to supply the grease 40 to the interior of the ball disposing portion 22Ab stably all the time.

Third Embodiment

Figure 22:
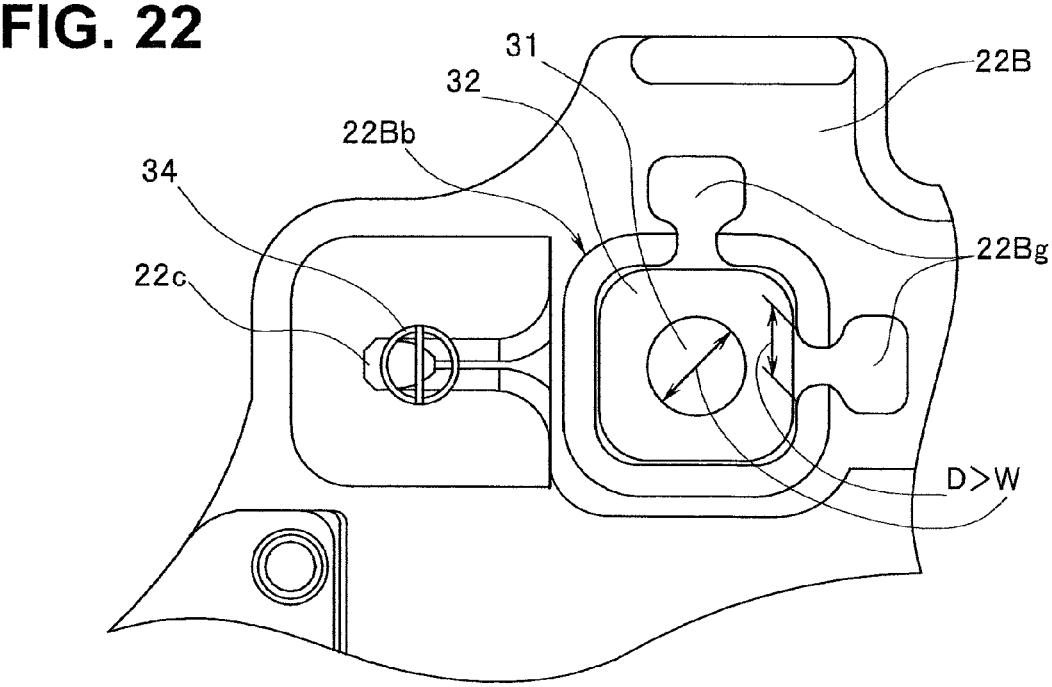
FIG. 22 is an enlarged view of main parts showing an enlarged view of the vicinity of the ball disposing portion when an image stabilization apparatus according to a third embodiment of the present invention is seen from the front.

FIG. 22 is an enlarged view of main parts showing an enlarged view of the vicinity of the ball disposing portion when an image stabilization apparatus according to a third embodiment of the present invention is seen from the front.

A basic configuration of the image stabilization apparatus of the present embodiment is substantially similar to that of the aforementioned first embodiment. The present embodiment is only different in the shape of the grease reserve portion made up of a small spatial region portion, communicating with the ball disposing portion. The rest of the configuration is the same as that of the aforementioned first embodiment. Therefore, the same components are assigned the same reference numerals and detailed description is omitted.

In the present embodiment, two grease reserve portions 22Bg are formed at the same locations as those in the aforementioned first embodiment. The opening at the notched portion of the wall surface of the ball disposing portion 22Bb has the same shape as that of the aforementioned first embodiment, whereas the volume of the small spatial region portion as the grease reserve portion 22Bg is formed to be greater than that of the second embodiment. With such a configuration, it is possible to increase the amount of the grease 40 filling the grease reserve portion 22Bg compared to that of the first embodiment and thereby secure the function of lubricating the ceramic ball 31 with the grease 40 stably for a longer period of time.

The above embodiments have been described by taking a case with a type of image pickup apparatus using a so-called lens shift type optical image stabilization apparatus that corrects image blur by moving part of (lens holding members that hold) optical lenses making up the image pickup optical system within the plane orthogonal to the optical axis at predetermined timing and in a predetermined direction as an example. However, the type of the image stabilization apparatus to which the configuration of the present invention is applicable is not limited to such a type.

For example, the configuration of the present invention is likewise applicable to a sensor shift type optical image stabilization apparatus in which an image pickup device (sensor) is configured to be movable or rotatable within a plane orthogonal to the optical axis (that is, the plane along the light receiving surface). In this case, for example, the movable barrel member mounted with the image pickup device is configured to be movable with respect to the fixed barrel member in the XY direction, and in that case, a ceramic ball as a support member is disposed between the movable barrel member and the fixed barrel member, the ceramic ball being configured to support the movable barrel member to the fixed barrel member. The configuration of the present invention is applicable in completely the same manner to the supply of the lubrication member to the ceramic ball in such a case.

Although a fixed installation type camera has been described as the image pickup apparatus having an image pickup function in the above-described embodiments, the image pickup apparatus may be a common image pickup apparatus held in hand by a user such as a digital single-lens reflex camera, a compact digital camera or a lens type camera, and the present invention is likewise applicable to a moving image pickup apparatus such as a video camera or a movie camera. Furthermore, the present invention is also applicable to a portable type communication terminal apparatus such as a mobile phone or a smartphone, a portable type information terminal (PDA: personal digital assist) such as an electronic notebook or an image pickup apparatus incorporated in a stationary device such as a television receiver or a personal computer as well. The present invention is also applicable to an industrial or medical optical device having an image pickup function such as an endoscope or microscope.

Note that the present invention is not limited to the aforementioned embodiments and it goes without saying that various modifications and applications can be made without departing from the spirit and scope of the present invention. Furthermore, the above embodiments include inventions in various stages and various kinds of invention can be extracted with an appropriate combination of a plurality of disclosed configuration requirements. For example, when several configuration requirements are deleted from all configuration requirements disclosed in the above embodiments, if the problems to be solved by the invention can be solved and advantageous effect of the invention can be achieved, the configuration from which the configuration requirements are deleted can be extracted as an invention. Moreover, components among different embodiments may be combined as appropriate. The invention is not restricted by any specific aspects except being limited by the appended claims.

The present invention is not limited to an image stabilization apparatus in an image pickup apparatus which is an electronic device specialized for an image pickup function alone, but can be widely applied to an image stabilization apparatus mounted on electronic devices of other types provided with image pickup functions such as digital cameras, movie cameras, mobile phones, smartphones, electronic notebooks, electronic dictionaries, portable information terminals, personal computers, tablet type terminal devices, game machines, television receivers, clocks, navigation devices using GPS (global positioning system) and various electronic devices provided with a voice recording and playback function.

In addition, the present invention is likewise applicable to an image stabilization apparatus in electronic devices having a function of acquiring images using an image pickup device and displaying the acquired images on a display apparatus, for example, observation apparatuses such as telescopes, binoculars, or microscopes.

What is claimed is:

1. An image stabilization apparatus comprising:
   a fixed barrel member;
   a movable barrel member configured to hold an optical lens or an image pickup device;
   a support member configured to movably support the movable barrel member with respect to the fixed barrel member within a plane orthogonal to an optical axis of the optical lens or within a plane along a light receiving surface of the image pickup device; and
   a drive unit configured to drive the movable barrel member with respect to the fixed barrel member,
   wherein the fixed barrel member or the movable barrel member is formed of a support member disposing portion configured to rotatably accommodate the support member and limit an amount of movement of the support member within the plane and a small spatial region portion formed by notching part of the support member disposing portion so as to communicate with the support member disposing portion, an interior of the small spatial region portion being filled with a lubrication member.

2. The image stabilization apparatus according to claim 1, wherein the support member comprises at least three balls.

3. The image stabilization apparatus according to claim 2, wherein an opening of the notched part of the support member disposing portion has a width size smaller than a diameter of the support member.

4. The image stabilization apparatus according to claim 2, wherein the support member disposing portion is provided in plurality at three locations in correspondence with the three balls, and
the plurality of support member disposing portions are arranged in a circumferential direction around the optical axis of the optical lens or a central axis of the light receiving surface of the image pickup device at substantially a same interval.

5. The image stabilization apparatus according to claim 2, wherein each of the support member disposing portions comprises two metallic flat plate members configured to sandwich one of the at least three balls.

6. The image stabilization apparatus according to claim 1, wherein the small spatial region portion is provided in plurality.

7. The image stabilization apparatus according to claim 1, wherein the small spatial region portion is formed on an upper side or a lateral side in a direction of gravity with respect to the support member disposing portion.

8. An image pickup apparatus comprising:
a camera unit comprising an image pickup device and an image pickup optical system;
a case configured to accommodate the camera unit; and
a cover member configured to cover and protect part of the camera unit,
wherein the image pickup apparatus applies the image stabilization apparatus according to claim 1.

* * * * *